(12) United States Patent
Ogasawara et al.

(10) Patent No.: US 7,237,450 B2
(45) Date of Patent: Jul. 3, 2007

(54) VEHICULAR AUTOMATIC POWER TRANSMISSION OPERATING DEVICE

(75) Inventors: Takeshi Ogasawara, Sano (JP); Daisuke Kondo, Tochigi (JP); Takeshi Satoh, Sano (JP); Takanori Mori, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 611 days.

(21) Appl. No.: 10/768,706

(22) Filed: Feb. 2, 2004

(65) Prior Publication Data

US 2004/0211617 A1    Oct. 28, 2004

(30) Foreign Application Priority Data

| Feb. 3, 2003 | (JP) | ............................ P 2003-026113 |
| Mar. 7, 2003 | (JP) | ............................ P 2003-062162 |
| Mar. 7, 2003 | (JP) | ............................ P 2003-062168 |

(51) Int. Cl.
*B60K 17/04* (2006.01)
(52) U.S. Cl. ..................................... 74/473.12; 74/335
(58) Field of Classification Search ............... 74/473.1, 74/473.11, 473.12, 335
See application file for complete search history.

(56) References Cited

U.S. PATENT DOCUMENTS 2,323,878 A * 7/1943 Kesling .................... 74/335
5,002,166 A * 3/1991 Leigh-Monstevens et al. .......................... 477/83
5,083,647 A * 1/1992 Bulgrien .................... 192/3.58
5,928,106 A * 7/1999 Biros et al. .................... 477/81

FOREIGN PATENT DOCUMENTS

| JP | 11-278087 A | 10/1999 |
| JP | 11-286225 A | 10/1999 |

OTHER PUBLICATIONS

U.S. Appl. No. 10/768,181, filed Feb. 2, 2004, Ogasawara et al.

* cited by examiner

*Primary Examiner*—David M. Fenstermacher
(74) *Attorney, Agent, or Firm*—Foley & Lardner LLP

(57) ABSTRACT

A vehicular automatic power transmission operating device includes an operating lever, a lever case, a torque sensor, a mounting member and a power assist unit. The operating lever creates operational force to shift into a position of an automatic power transmission. The lever case accommodates a lower end portion of the operating lever therein. The torque sensor detects operational force of the operating lever. An input shaft and an output shaft of the torque sensor serve as a rotary shaft of the operating lever. The mounting member is divided into first and second members by the input shaft and the output shaft of the torque sensor. Provided in the first and second members, respectively, are first and second fixing members by which the input shaft is fixed to the mounting member, and first and second bearing portions by which the output shaft is rotatably supported to the mounting member. The power assist unit creates power assist force and adds it to operational force of the operating lever in response to output from the torque sensor.

21 Claims, 10 Drawing Sheets

VEHICULAR AUTOMATIC POWER TRANSMISSION OPERATING DEVICE

CROSS REFERENCE TO RELATED APPLICATIONS

This application claims benefit of priority under 35 U.S.C § 119 to Japanese Patent Application No.2003-26113, filed on Feb. 3, 2003, Japanese Patent Application No.2003-62162, filed on Mar. 7, 2003 and Japanese Patent Application No.2003-62168, filed on Mar. 7, 2003, the entire contents of which are incorporated by reference herein.

BACKGROUND OF THE INVENTION

1. Field of the Invention

The present invention relates to a vehicular automatic power transmission operating device in which an operating lever shifts into a range position of an automatic power transmission.

2. Description of the Related Art

A vehicular automatic power transmission operating device of the related art has a power assist unit that, for the purpose of easily shifting into a range position of an automatic power transmission, adds power assist force to operational force (rotational torque) resulting from an operation input unit.

The power assist unit is coupled to the operation input unit in two structures, that is, one structure in which the former is directly connected to the latter and the other structure in which the former is indirectly connected to the latter.

The structure in which the former is directly connected to the latter is disclosed in Japanese Patent Provisional Publication No. 11-286225. An operation input unit is accommodated inside of a case. A torque sensor is inserted to a sensor accommodating section formed in a lower end of an operating lever (forming one part of the operation input unit) at one end of the sensor accommodating section. An input shaft of the torque sensor is coupled to the operating lever through a splinted portion formed on the other end of the sensor accommodating section. An output shaft of the torque sensor is rotatably supported by the case through a bush. A rotary shaft of the operating lever corresponds to the input shaft and the output shaft of the torque sensor.

The structure in which the former is directly connected to the latter is described below. An operation input unit is fixed to a cross car beam, disposed inside of an instrument panel compartment, through a bracket. The torque sensor is connected to a lower lever (forming one part of the operation input unit) which is fixed to a lower end of the operating lever, via a control cable. If the operating lever bears load resulting from secondary collision, the operating lever is retracted into the instrument panel compartment while the lower lever moves toward a vehicle front to assume a position near a side of the cross car beam. To this end, the instrument panel compartment is provided with a space in an area close proximity to the side area of the cross car beam so as to move the lower lever toward the vehicle front.

The structure in which the former is directly connected to the latter suffers from an issue described below. The sensor accommodating section has one end formed with an opening with a large diameter for inserting the torque sensor therein. Since the large diameter has a larger tolerance range than a small diameter in the same tolerance class, assembling precision is deteriorated between the torque sensor and the sensor accommodating section, and then it becomes hard for the operating lever to adequately and smoothly rotate. Also, if assembling precision is deteriorated between the input shaft of the torque sensor and the splinted portion, it becomes hard for operational force of the operating lever to be correctly transferred to the torque sensor. Accordingly, the torque sensor is unable to correctly detect real operational force of the operating lever, and power assist force cannot be appropriately added to operational force. Additionally, if looseness occurs between the input shaft of the torque sensor and the splinted portion, the torque sensor is shaky to output unstable detected value.

Further, an upper end portion of the case cover is formed with an opening in older to insert the operating lever into the case. Provided between the operating lever and a peripheral-edge portion of the opening is a minute gap to allow the operating lever to rotatably slide. If a long distance exists between the opening and an operating knob which is mounted in an upper end of the operating lever, the operating lever is shaky to cause the unstable detected value to the torque sensor.

The structure in which the former is indirectly connected to the latter encounters an issue described below. Since the instrument panel compartment is provided with the space in the area close proximity to the side area of the cross car beam in order to move the lower lever toward the vehicle front, rearranged rearward of the vehicle are vehicle components to be originally displaced in the space. Therefore, the instrument panel and the operation input unit are displaced rearward of the vehicle in response to an area occupied by the vehicle components. Thus, a vehicle compartment tends to have a narrowed space.

SUMMARY OF THE INVENTION

It is therefore an object of the present invention to provide a vehicular automatic power transmission operating device in which operational force of an operating lever is correctly and stably detected so as to add power assist force to the operational force appropriately. Also, it is another object of the present invention to provide a vehicular automatic power transmission operating device in which an instrument panel compartment has the space where an operating lever is moved toward the vehicle front in secondary collision, without narrowing a vehicle compartment.

To achieve the above objects, the present invention provides a vehicular automatic power transmission operating device comprising, an operating lever for creating operational force to shift into a position of an automatic power transmission, an operating knob disposed at an upper end of the operating lever, an accommodating member for accommodating a base end portion of the operating lever, a torque detector for detecting the operational force, wherein an input shaft and an output shaft of the torque detector serving as a rotary shaft of the operating lever, a mounting member for mounting the torque detector to the base end portion of the operating lever, wherein the mounting member having first and second fixing portions for fixing the input shaft thereto and first and second bearing portions for rotatably supporting the output shaft thereto, and a power assist unit for adding power assist force to the operational force in response to output of the torque detector.

According to the present invention, assembling the first fixing portion and the second fixing section allows the input shaft of the torque sensor to be fixed to the mounting member, and assembling the first bearing portion and the second bearing section allows the output shaft of the torque sensor to be rotatably supported by the mounting member. Accordingly, the mounting member has only the opening with small diameter, resulting in improvement over assembling precision between the torque sensor and the mounting member. Also, since the input shaft is fixed to the mounting member, the shakiness of the input shaft is suppressed. This results in a capability for the torque detector to correctly and stably detect operational force of the operating lever.

With a preferred embodiment of the present invention, the accommodating member has the upper end surface formed with a slide bore portion for receiving the base end portion of the operating lever therein, and the operating lever includes the slide member that slides in the slide bore portion in abutting contact with the opening inner-peripheral edge portion thereof.

With such an embodiment, even if the shakiness of the operating lever occurs in the base end portion thereof, the slide member suppresses the operating lever from the occurrence of shakiness.

To achieve the above objects, the present invention provides A vehicular automatic power transmission operating device, comprising an instrument panel compartment formed in a vehicle compartment with a instrument panel, an operation input unit disposed in the instrument panel compartment to transfer operational force, for shifting into a position of an automatic power transmission, to the automatic power transmission, wherein the operation input unit having an operating lever protruding from the instrument panel compartment toward the vehicle compartment to create the operational force, an operational force transfer lever disposed in the instrument panel compartment and having one end fixed to the operation input unit, and a cable disposed in the instrument panel compartment and mounted to the other end of the operational force transfer lever for transferring the operational force to the automatic power transmission, wherein the other end of the operational force transfer lever being disposed beneath the operation input unit in the vicinity of the instrument panel.

According to the present invention, since the other end portion of the operational force transfer lever is connected to the cable and located beneath the operation input device in the vicinity of the instrument panel, the instrument panel can be positioned in a forward area of the vehicle. Consequently, a space in the vehicle compartment can be enlarged.

DETAILED DESCRIPTION OF THE PREFERRED EMBODIMENTS

Now, referring to FIGS. 1 to 10, various embodiments of the present invention are described. With respect to a first embodiment, description is made of a vehicular automatic power transmission operating device in which a power assist unit is directly coupled to an operation input unit. With respect to a second embodiment, description is made of a vehicular automatic power transmission operating device in which the power assist unit is indirectly coupled to the operation input unit.

First Embodiment

Figure 1:
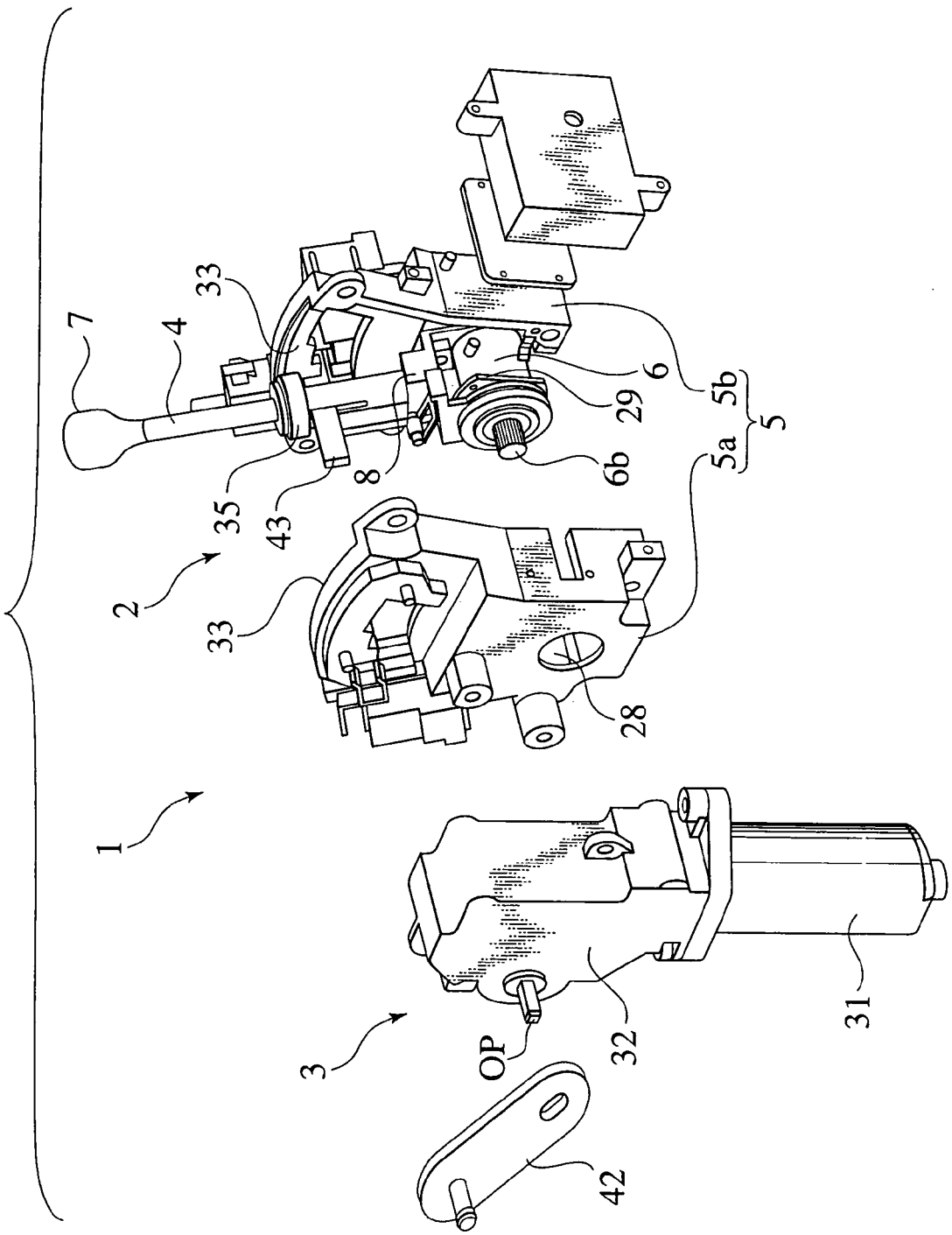
FIG. 1 is an exploded perspective view of a vehicular automatic power transmission operating device of a first embodiment according to the present invention.
Figure 2:
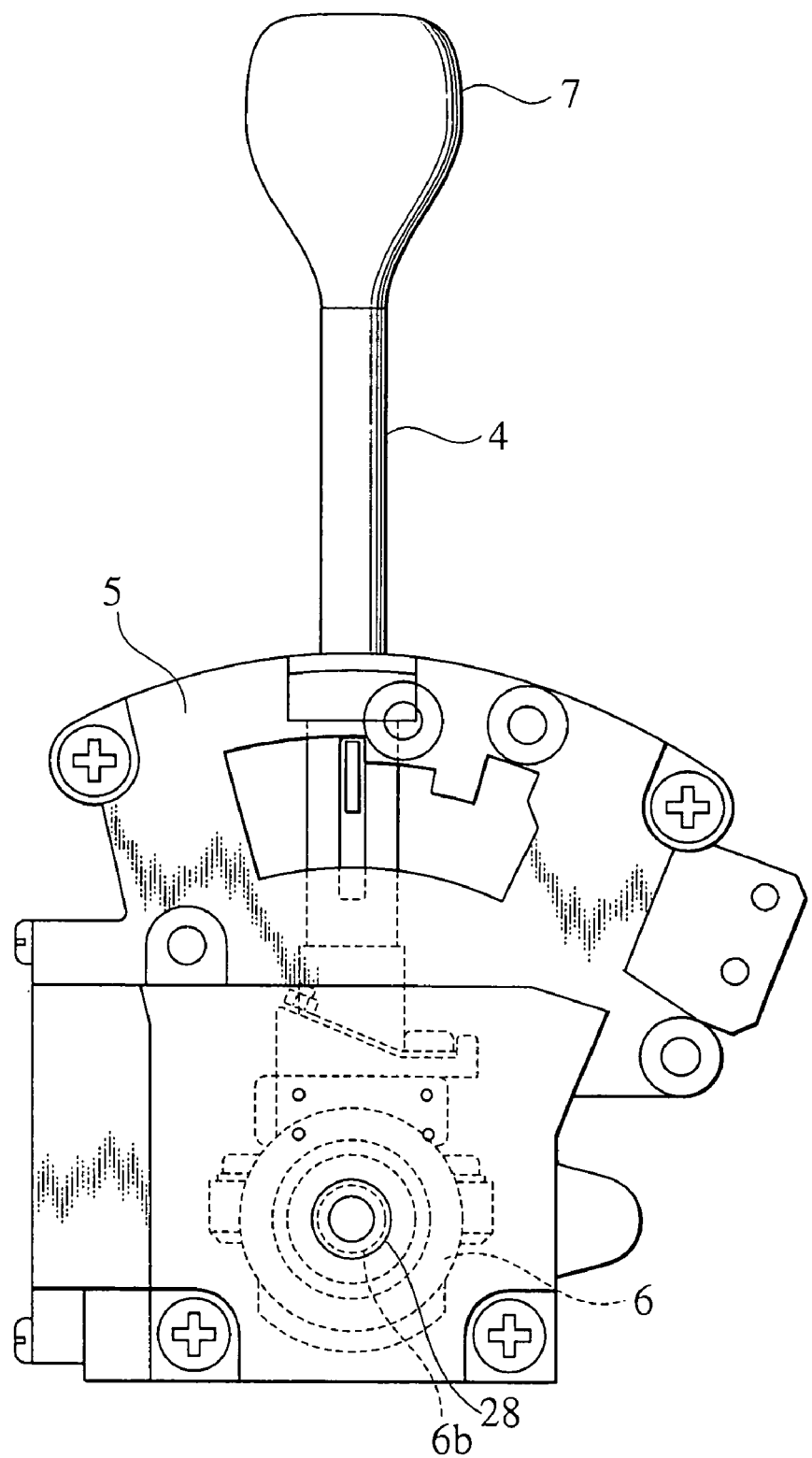
FIG. 2 is a side view of the vehicular automatic power transmission operating device of the first embodiment according to the present invention.

As shown in FIG. 1, the vehicular automatic power transmission operating device 1 is comprised of an operation input unit 2, a power assist unit 3 and an operating transmission lever 42. The operation input unit 2 creates shift force (rotational torque) for shifting into a range position (such as "P" range, "R" range, "N" range, "D" range and "L" range or the like) of an automatic power transmission. The power assist unit 3 creates power assist force to be added to the shift force. The operating transmission lever 42 transfers output of the power assist unit 3 to the automatic power transmission.

The operation input unit 2 is comprised of an operating lever 4, a lever case (accommodating member) 5, a torque sensor (torque detector) 6, an operating knob 7, a mounting member 8 and a stopper lever 43.

The operating lever 4 creates operational force for shifting into the range position of the automatic power transmission. The lever case 5 is constructed of a first case 5a and a second case 5b to internally support the operating lever 4 for rotary movement. The torque sensor 6 detects operational force resulting from the operating lever 4. The operating knob 7 is mounted to an upper end of the operating lever 4. When an operator grips the operating knob 7 and slides the operating lever 4, operational force is created. The mounting member 8 is mounted on a lower end of the operating lever 4. The torque sensor 6 is mounted to the operating lever 4 via the mounting member 8.

Figure 3:
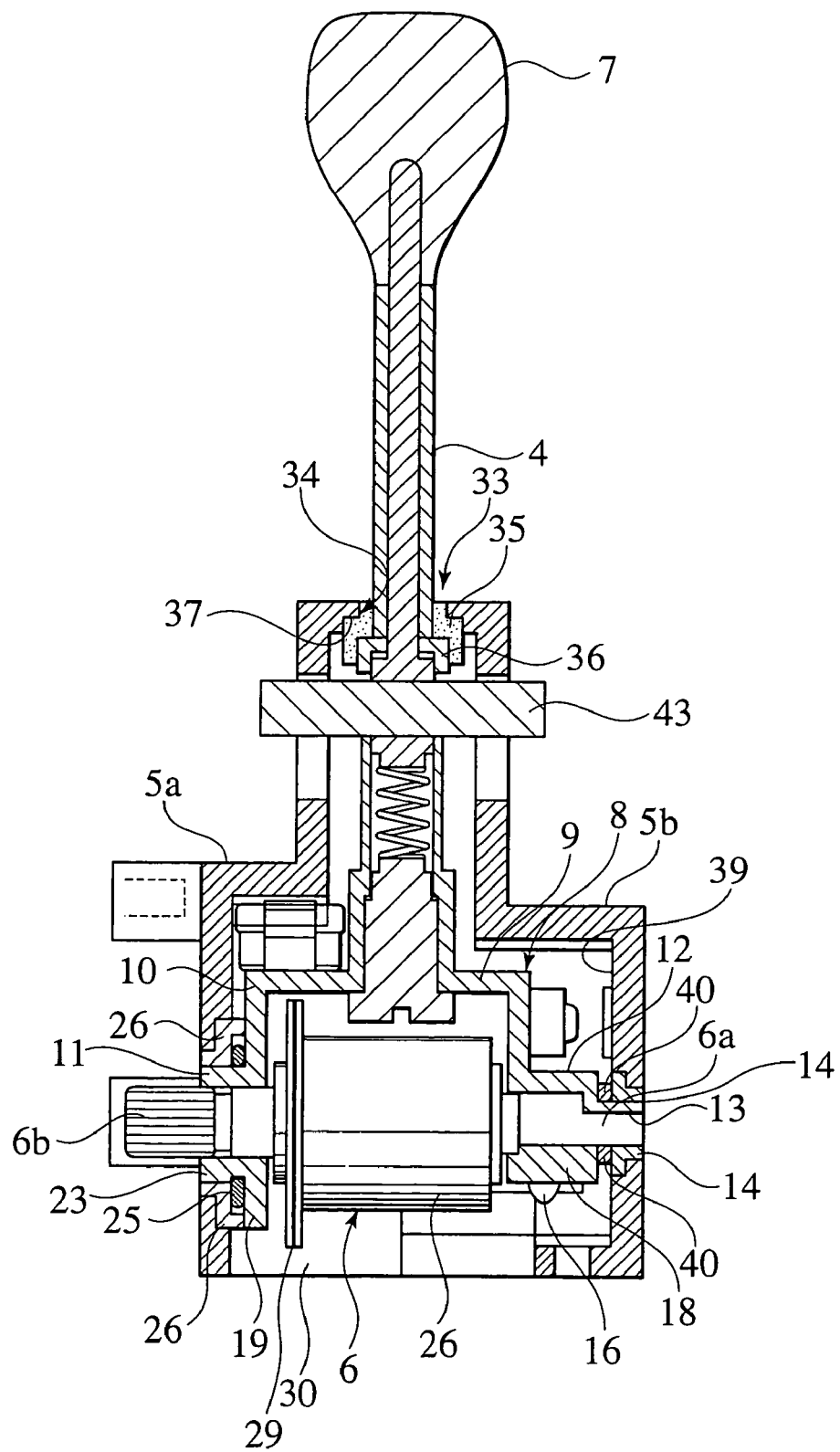
FIG. 3 is a cross sectional view of the vehicular automatic power transmission operating device of the first embodiment of the present invention.
Figure 4:
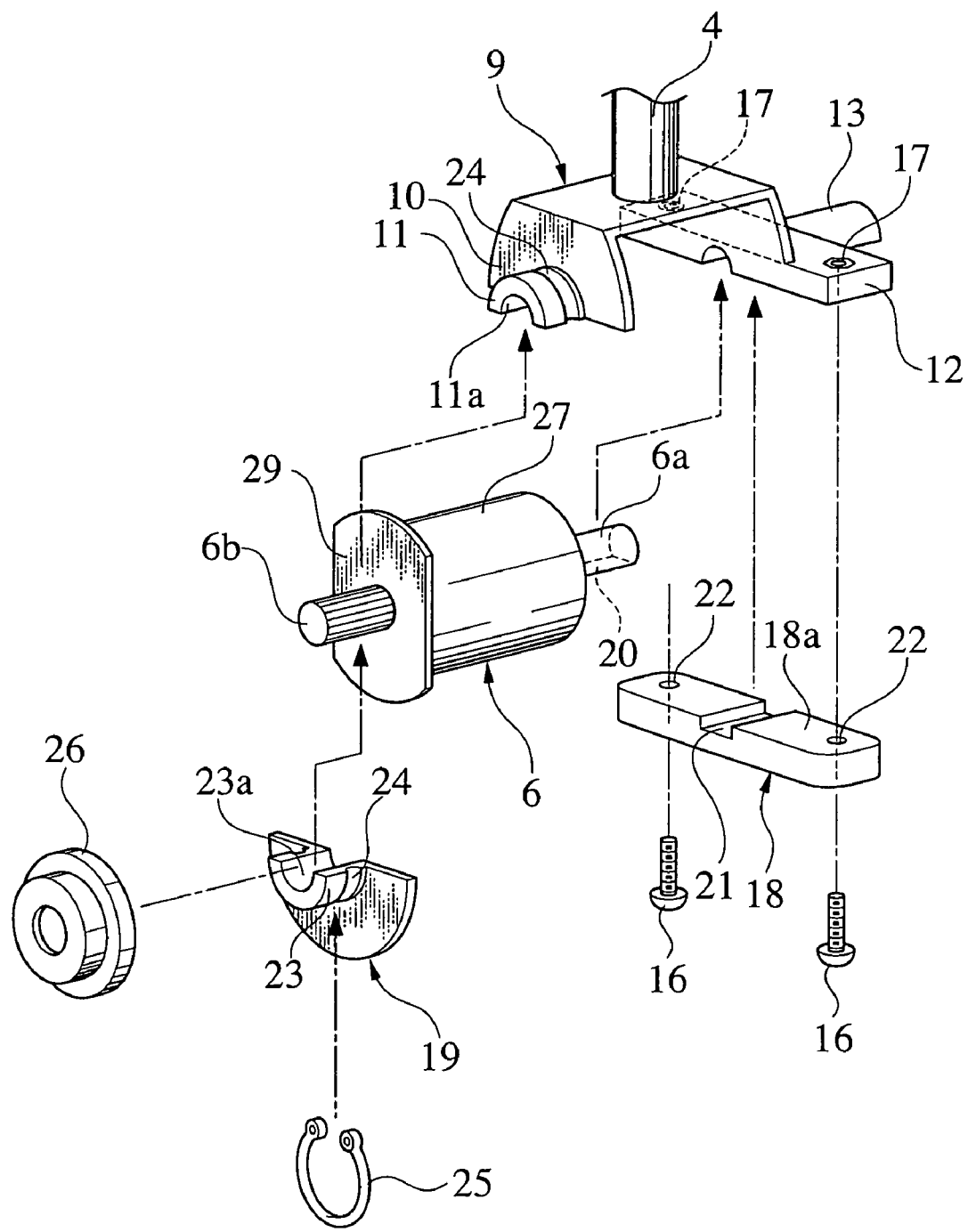
FIG. 4 is an exploded perspective view of a mounting member, for mounting a torque sensor to a lower end portion of an operating lever, of the vehicular automatic power transmission operating device of the first embodiment of the present invention.

As shown in FIGS. 3 and 4, the mounting member 8 is divided into an upper member and a lower member by an input shaft 6a and an output shaft 6b of the torque sensor 6. Also, the input shaft 6a and the output shaft 6b correspond to a rotary shaft of the operating lever 4. The stopper lever 43 prevents the operating lever 4 from moving. When the operator presses a button (not shown) of the operating knob 7, the stopper lever 43 permits the operating lever 4 to move.

The upper member is fixedly secured to the lower end portion of the operating lever 4 and includes a lever base 9 with a cross sectional profile in a substantially U-shape. The lever base 9 has one end formed with a first bearing member 10. The first bearing member 10 has a lower central area formed with an first output shaft guide portion 11. The first output shaft guide portion 11 has a first bearing surface 11a formed in a semicircular arc shape for rotatably covering an upper half of the output shaft 6b. An outer-periphery of the first output shaft guide portion 11 is formed with an upper half of a ring mounting recess 24.

Further, the lever base 9 has the other end formed with a first fixture member 12. The first fixture member 12 has a lower central portion formed with an input shaft guide portion 13. The input shaft guide portion 13 covers an upper half of the input shaft 6a of the torque sensor 6. Formed on both ends of the first fixture member 12 are first threaded bores 17, 17.

The lower member is comprised of a second fixture member 18 and a second bearing member 19. The second fixture member 18 is mounted to the first fixture member 12 so as to cover a lower half of the input shaft 6a. The second bearing member 19 is mounted to the first bearing member 10 so as to cover a lower half of the output shaft 6b.

Formed on a central area of the second fixture member 18 is a flat portion 21 with which a flat portion 20 formed on a lower end of the input shaft 6a is placed in tight contact. The flat portion 21 forms a bottom surface of a rectangular recessed portion formed in a central area of a fixing surface 18a of the second fixture member 18. Formed on both ends of the second fixture member 18 are second threaded bores 22, 22. Turning screws 16, 16 into the first threaded bores 17, 17 and the second threaded bores 22, 22 allows the second fixture member 18 to be mounted to the first fixture member 12 and the input shaft 6a to be sandwiched between the first fixture member 12 and the second fixture member 18.

Assembling the second fixture member 18 onto the first fixture member 12, under a condition where the flat portion 20 of the input shaft 6a is placed in abutting engagement with the flat portion 21 of the second fixture member 18, renders the input shaft 6a to be free from being shaky both in a rotational direction and axial direction thereof. Therefore, in the vehicular automatic power transmission operating device 1, the torque sensor 6 accurately and stably detects rotational torque of the operating lever 4.

The second bearing member 19 has an upper central portion formed with a second output shaft guide portion 23. The second output shaft guide portion 23 has a second bearing surface 23a formed in a semicircular arc shape for rotatably covering a lower half of the output shaft 6b. Assembling the second bearing member 19 onto the first bearing member 10 allows the second output shaft guide portion 23 to be coupled to the first bearing guide portion 11 such that the output shaft 6b is rotatably supported. Formed on an outer periphery of the second output shaft guide portion 23 is a lower half of a ring mounting recess 24. Mounting a ring member 25 onto the ring mounting recess 24, after the second bearing member 19 is brought into abutting engagement with the first bearing member 10, allows the second bearing member 19 to be assembled to the first bearing member 10. The ring member 25 has a C-shaped cross section and elasticity.

The first bearing member 10 and the second bearing member 19 that are assembled to one another through the ring member 25 is inserted to a bush 26 that is press-fitted to the first case 5a and secured to the first case 5a.

The torque sensor 6 includes a sensor body 27, the input shaft 6a and the output shaft 6b. The sensor body 27 has one end from which the input shaft 6a protrudes, and the other end from which the output shaft 6b protrudes. The flat portion 20 is formed on a lower end portion of the input shaft 6a. The output shaft 6b is disposed on the same axis with the input shaft 6a and is rotatably supported with the first bearing member 10 and the second bearing member 19. A distal end of the output shaft 6b is connected to the power assist unit 3 through a circular bore 28 formed in the first case 5a (see FIGS. 1 and 2).

Figure 5:
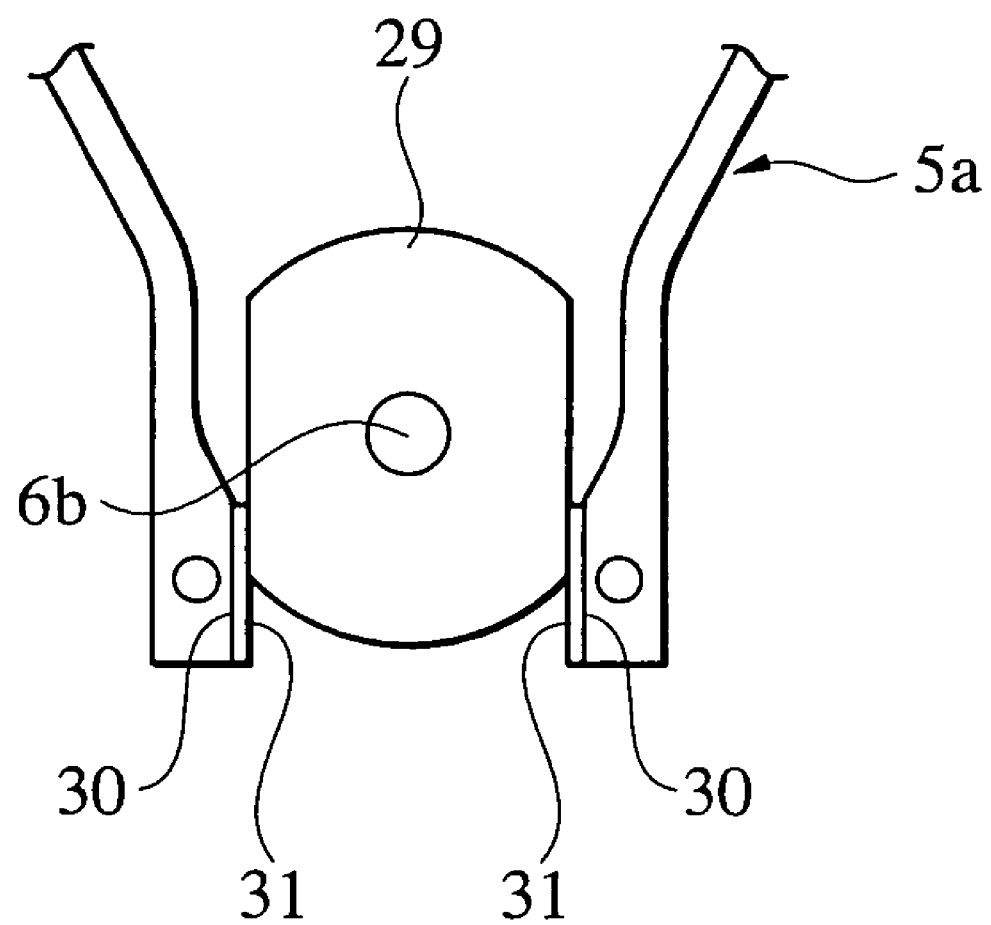
FIG. 5 is a view illustrating a status, in which a torque sensor is fixed to a lever case, of the vehicular automatic power transmission operating device of the first embodiment of the present invention.

The sensor body 27 has the other end formed with a flat board 29 that precludes the torque sensor 6 from rotation. As shown in FIG. 5, the flat board 29 is sandwiched between inner walls 30, 30 of the first case 5a and, hence, the torque sensor 6 is free from being shaky in the rotational direction thereof. Also, attached to the inner walls 30, 30 are rubber members 31, 31 that preclude the torque sensor 6 from suffering from looseness resulting from distortions of the inner walls 30, 30. Sandwiching the sensor body 27 between the rubber members 31, 31 enables the torque sensor 6 to accurately and stably detect rotational torque of the operating lever 4.

Next, referring to FIG. 3, detailed description is made of a structure in which the operating lever 4 is rotatably supported in the lever case 5. The operating lever 4 retains the torque sensor 6 by means of the mounting member 8. The input shaft 6a of the torque sensor 6 and the input shaft guide portion 13 are inserted to a bush 14, provided in the second case 5b, such that the operating lever 4 is rotatably supported by the second case 5b. The output shaft 6b of the torque sensor 6, the first bearing member 10 and the second bearing member 19 are inserted to the bush 26, provided in the first case 5a, such that the operating lever 4 is rotatably supported by the first case 5a. An intermediate portion of the operating lever 4 penetrates through a slide bore portion 33 formed in an upper end of the lever case 5, and the lower end portion of the operating lever 4 is accommodated inside of the lever case 5. A length of a circular arc of the slide bore portion 33 is designed to be equal to a range in which the operating lever 4 is available to slide.

Figure 6:
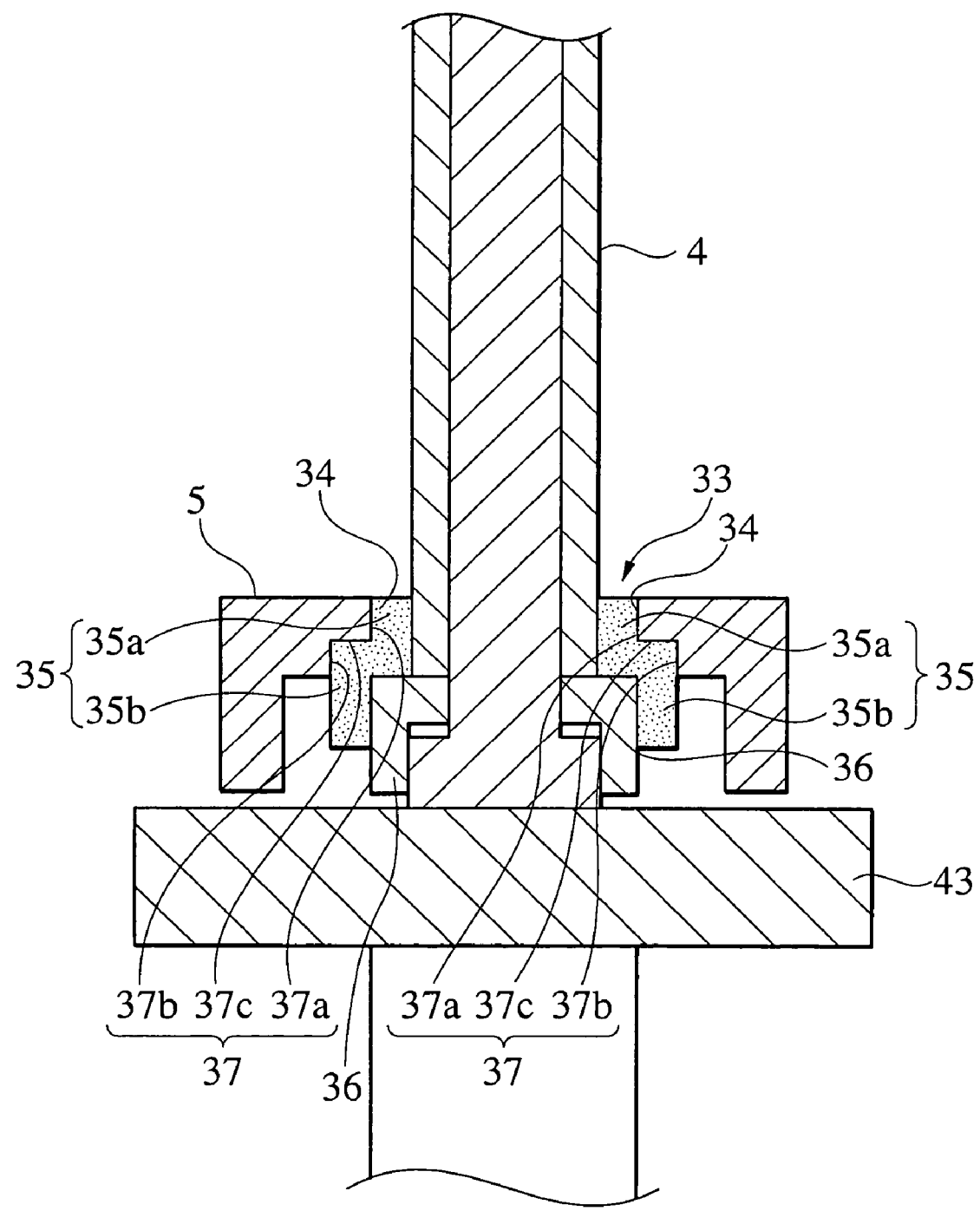
FIG. 6 is an enlarged cross sectional view of a sliding bore portion in the vehicular automatic power transmission operating device of the first embodiment of the present invention.

As shown in FIGS. 3 and 6, mounted to an outer-periphery of the intermediate portion of the operating lever 4 is a slide member 35 that is slid ably held in contact with an opening inner-peripheral edge 34 of the slide bore portion 33. The slide member 35 is comprised of a small diameter portion 35a and a large diameter portion 35b and formed in a slide sleeve in which two cylindrical portions are formed with mutually different diameters. An inner-peripheral surface of an upper portion of the large diameter portion 35b merges with an outer-periphery of a lower portion of the small diameter portion 35a.

The slide member 35 is fixed to the intermediate portion of the operating lever 4. The upper end of the lever case 5 is formed at the position closer to the operating knob 7 than a rotational axis of the operating lever 4 (the input shaft 6a and the output shaft 6b of the torque sensor 6) so as to suppress the shakiness of the operating lever 4. In response to the above-described position, the slide member 35 is fixed at the position closer to the operating knob 7 than a rotational axis of the operating lever 4.

The slide member 35 is fixed with a support 36 formed at the intermediate portion of the operating lever 4. A diameter of the support 36 is equal to a diameter of the small diameter portion 35a. By abutting a lower end surface of the small diameter portion 35a to an upper end surface of the support 36 and then fitting the support 36 into the large diameter portion 35b, the slide member 35 is fixed to the intermediate portion of the operating lever 4. Therefore, the support 36 prevents the slide member 35 from falling out downward (toward the torque sensor 6) from the intermediate portion of the operating lever 4.

Formed on the opening inner-peripheral edge 34 of the slide bore portion 33 is a guide section 37 that guides the slide member 35. The guide section 37 has a stepped cross sectional surface and is comprised of a first guide surface 37a, a second guide surface 37b and a third guide surface 37c. The first guide surface 37a is held in contact with an outer-peripheral surface of the small diameter portion 35a. The second guide surface 37b is held in contact with an outer-peripheral surface of the large diameter portion 35b. The third guide surface 37c is held in contact with an upper end face of the large diameter portion 35b. The guide section 37 is formed along the slide bore portion 33. Also, the slide member 35 has a freedom to some extent in a vertical direction.

As shown in FIG. 3, a spring member 40 is mounted between the mounting member 8 and the bush 14. The spring member 40 includes a resilient member such as a wave washer. The spring member 40 urges the mounting member 8 toward the first case 5a. Accordingly, a margin in which the spring member 40 is compressed is effective to absorb dimensional difference between the mounting member 8 and the lever case 5, thereby the operating lever 4 and the torque sensor 6 is free from being shaky.

The power assist unit 3 is comprised of an electric motor 31, a case 32, a gear reduction mechanism (not shown) and an output shaft OP. The electric motor 31 generates power assist force to be added to operational force created by the operation input device 2. The case 32 has a lower end to which the electric motor 31 is fixed. The gear reduction mechanism is accommodated in the case 32 and includes a worm wheel gear and a worm gear. The worm wheel gear meshes with the output shaft 6b of the torque sensor 6. The worm gear rotates together with a shaft of the electric motor 31 and meshes with the worm wheel gear and the operating transmission lever 42.

The detected value of the rotational torque of the operating lever 4 increases, as operational force of the operating lever 4 increases. In response to the increase of the detected value, the power assist unit 3 varies a voltage applied to the electric motor 31. The power assist unit 3 creates rotational force of the electric motor 31 and then adds it as power assist force to operational force of the operating lever 4. Finally, output of the power assist unit 3 is applied to the output shaft OP.

The vehicle automatic power transmission operating device 1 has features listed below.

When assembling the torque sensor 6 to the lower end of the operating lever 4, the first fixture member 12 and the second fixture member 18 allows the input shaft 6a of the torque sensor 6 to be fixedly secured for non-rotary movement, and the first bearing member 10 and the second bearing member 19 allows the output shaft 6b of the torque sensor 6 to be rotatably supported. Therefore, since the shakiness of the input shaft 6a in the rotational direction and axial direction thereof can be suppressed, the torque sensor 6 correctly detects operational force of the operating lever 4 and then outputs the detected value in a stable manner.

When assembling the torque sensor to the lower end of the operating lever in the vehicular automatic power transmission operating device of the related art, an end portion of the sensor accommodating section is formed with an opening with a large diameter in which the torque sensor is inserted. However, in the vehicular automatic power transmission operating device of the present invention, since the torque sensor 6 is assembled to the lower end portion of the operating lever 4 via the mounting member 8, the torque sensor 6 and the mounting member 8 can be assembled in a high precision and the shakiness of the torque sensor 6 can be effectively suppressed.

Sandwiching the flat board 28, formed on the sensor body 27 of the torque sensor 6, between the inner wall surfaces 30, 30 of the first case 5a suppresses the shakiness of the torque sensor 6 in the rotational direction of the torque sensor 6.

Since the torque sensor 6 is assembled to the operating lever 4 from a lower area of the operating lever 4, workability is improved and an assembling precision is increased.

Since the slide member 35 slides with the operating lever 4 while remaining in contact with the opening inner-peripheral edge 34, the shakiness of the operating lever 4 is suppressed. That is, since the slide member 35 is operative to bury a gap between the operating lever 4 and the slide bore portion 33, the operating lever 4 smoothly slides. Although it is conceivable for the rotary shaft of the operating lever 4 and the bush 14 to be machined at a high precision so as to suppress the shakiness of the operating lever 4, an expedient in which the slide member 35 is mounted to the operating lever 4 is more preferable than a method of increasing the machining precision of the associated members because production cost of the vehicular automatic power transmission operating device 1 is reduced.

In order to prevent the torque sensor from being dismounted from the device in the vehicular automatic power transmission operating device of the related art, mounted to a case is a cover case which rotatably supports the output shaft of the torque sensor. The torque sensor can move in the axial direction of the rotary shaft of the operating lever via a splined portion by looseness between the torque sensor and the splined portion or between the case and the case cover. The above-described movement is reflected as the shakiness of the operating lever in a leftward and rightward direction (along the axial direction of the rotary shaft) thereof. On the contrary, in the vehicular automatic power transmission operating device of the present invention, the spring member 40 is disposed between the mounting member 8 and the bush 14, causing the operating lever 4 to be urged toward the first case 5a with constant urging force. Therefore, it becomes possible to suppress the shakiness of the operating lever 4 and the torque sensor 6 in the leftward and rightward direction thereof.

Figure 7:
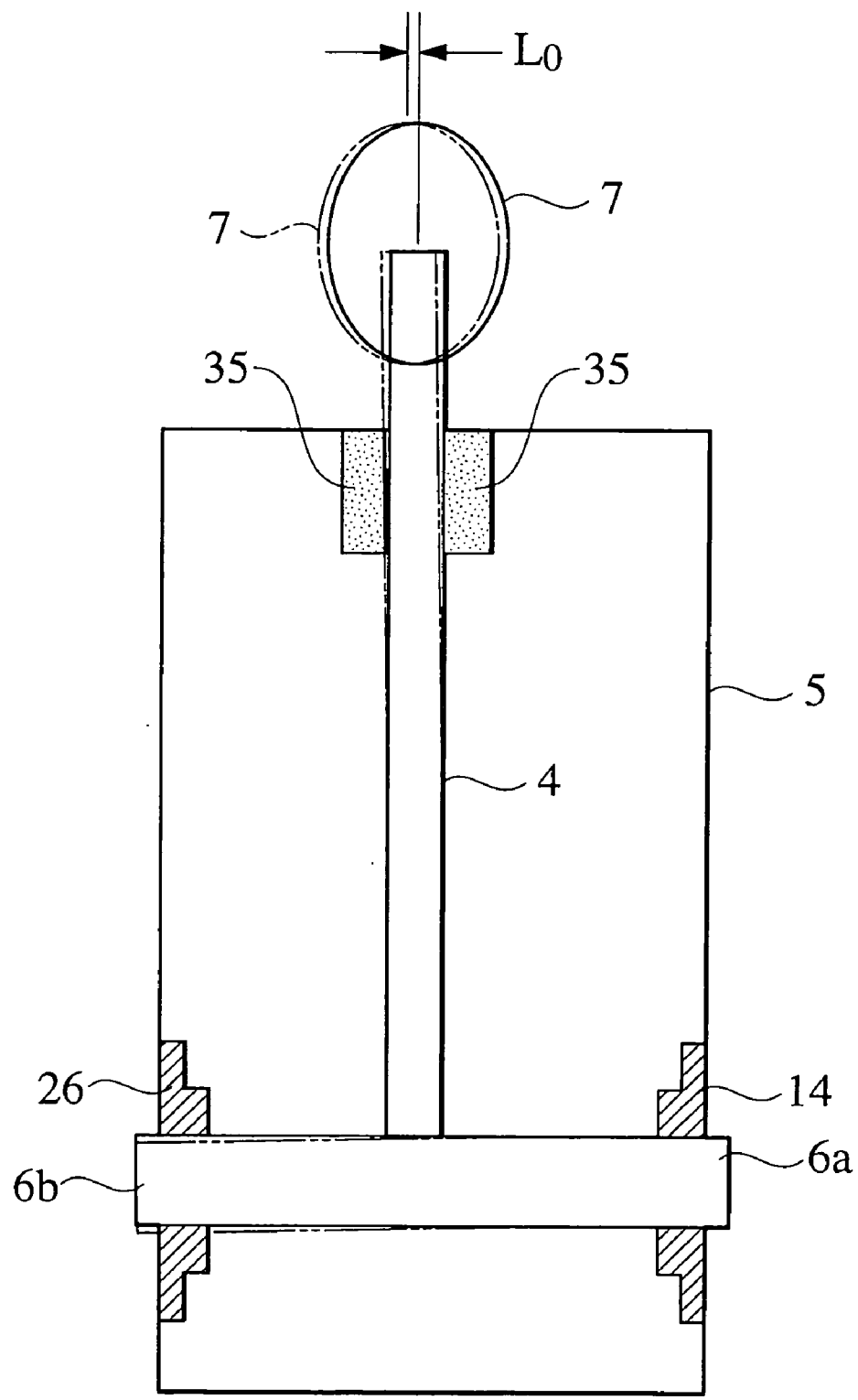
FIG. 7 is a schematic illustrative view showing the vehicular automatic power transmission operating device of the first embodiment of the present invention wherein looseness of a base end portion of the operating lever is suppressed with a slide member.

The slide member 35, which slides along the opening inner-peripheral edge 34 while kept in contact therewith during rotary movement of the operating lever 4, is disposed closer to the operating knob 7. As shown in FIG. 7, therefore, even in the occurrence of looseness between the output shaft 6b of the torque sensor 6 and the bush 20, the shakiness of the operating lever 4 that would occur in the leftward and rightward direction thereof can be suppressed to a value of approximately $L_0$. Also, even when applying an operation input unit of a short stroke for the vehicular automatic power transmission operating device 1, the operating lever 4 adequately and smoothly rotates. Therefore an operator is available to bodily sense such as a comfortable shift feeling.

Second Embodiment

Figure 8:
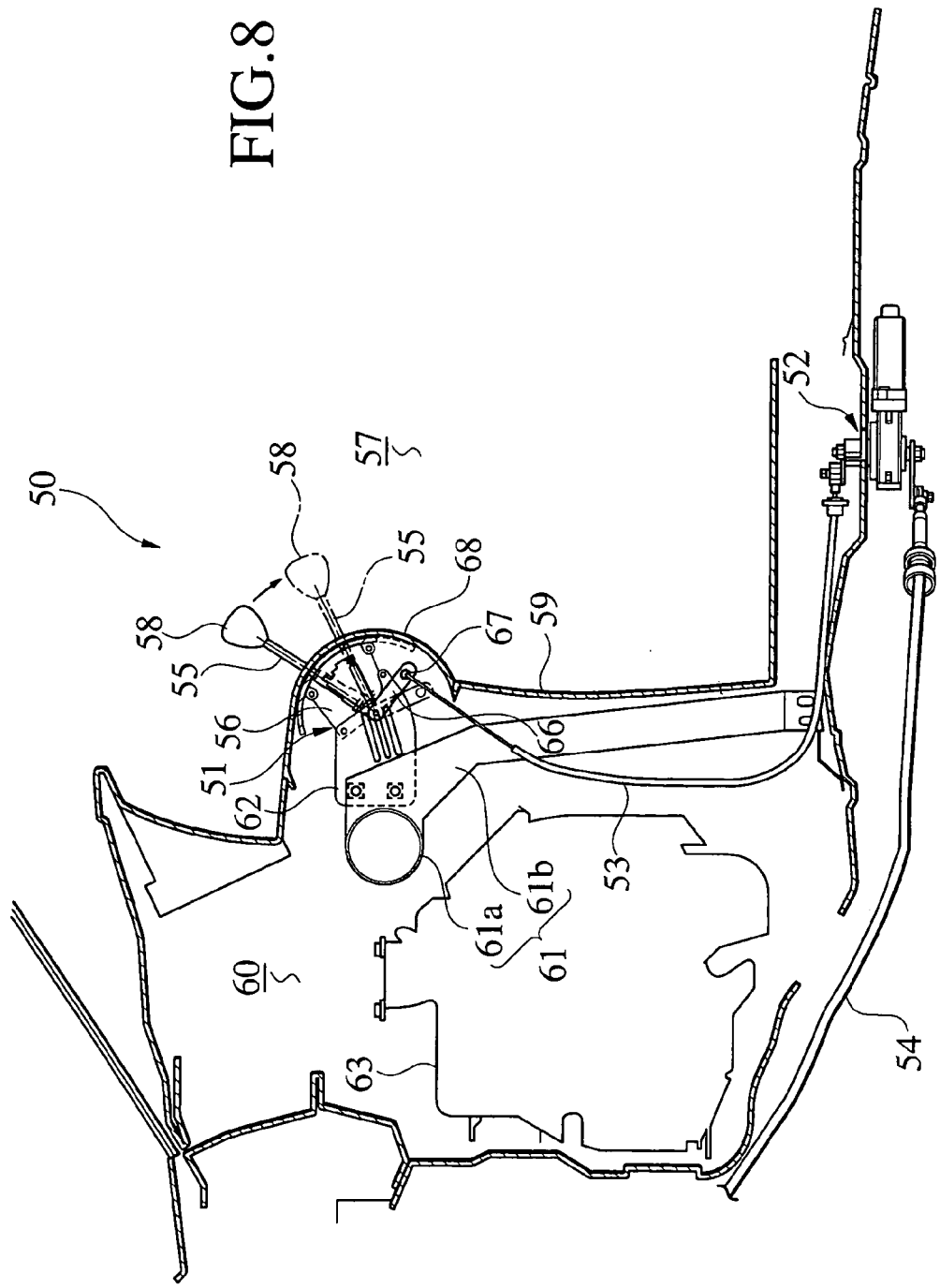
FIG. 8 is a schematic structural view of a vehicular automatic power transmission operating device of a second embodiment of the present invention.

As shown in FIG. 8, a vehicular automatic power transmission operating device 50 is comprised of an operation input unit 51, a power assist unit 52, a first cable 53 and a second cable 54. The operation input unit 51 is fixed through a bracket 62 to a cross car beam 61 that is disposed inside of an instrument panel compartment 60 along a vehicle widthwise direction. Also, an instrument panel 59 partitions a vehicle compartment 57 and the instrument panel compartment 60. The operation input unit 51 creates operational force (rotational torque) for shifting into a range position of an automatic power transmission. The power assist unit 52 creates power assist force and then adds it to operational force. The first cable 53 has one end connected to the operation input unit 51 through a lower lever (operational force transfer lever) 66 and the other end connected to the power assist unit 52, thereby transferring operational force to the power assist unit 52. The second cable 54 transfers output of the power assist device 52 to the automatic power transmission.

The operation input unit 51 is comprised of an operating lever 55, a lever box 56 and an operating knob 58. The operating lever 55 creates operational force for shifting into the range position of the automatic power transmission. The lever box 56 is fixed to the cross car beam 61, disposed inside of the instrument panel compartment 60, through the bracket 62 and supports the operating lever 55 for rotary movement. The operating knob 58 is mounted onto an upper end of the operating lever 55 and disposed in the vehicle compartment 57. When an operator grips the operating knob 58 and slides the operating lever 55, operational force is created.

The cross car beam 61 serves as a reinforce member that forms a frame to accommodate an air conditioning unit 63 and electrical equipments in the instrument panel compartment 60 and includes a cross car beam body 61a and a support stay 61b. The cross car beam body 61a includes a tabular member made of steel that extends in the vehicle widthwise direction. The support stay 61b extends from the cross car beam body 61a toward the instrument panel 59.

Figure 9:
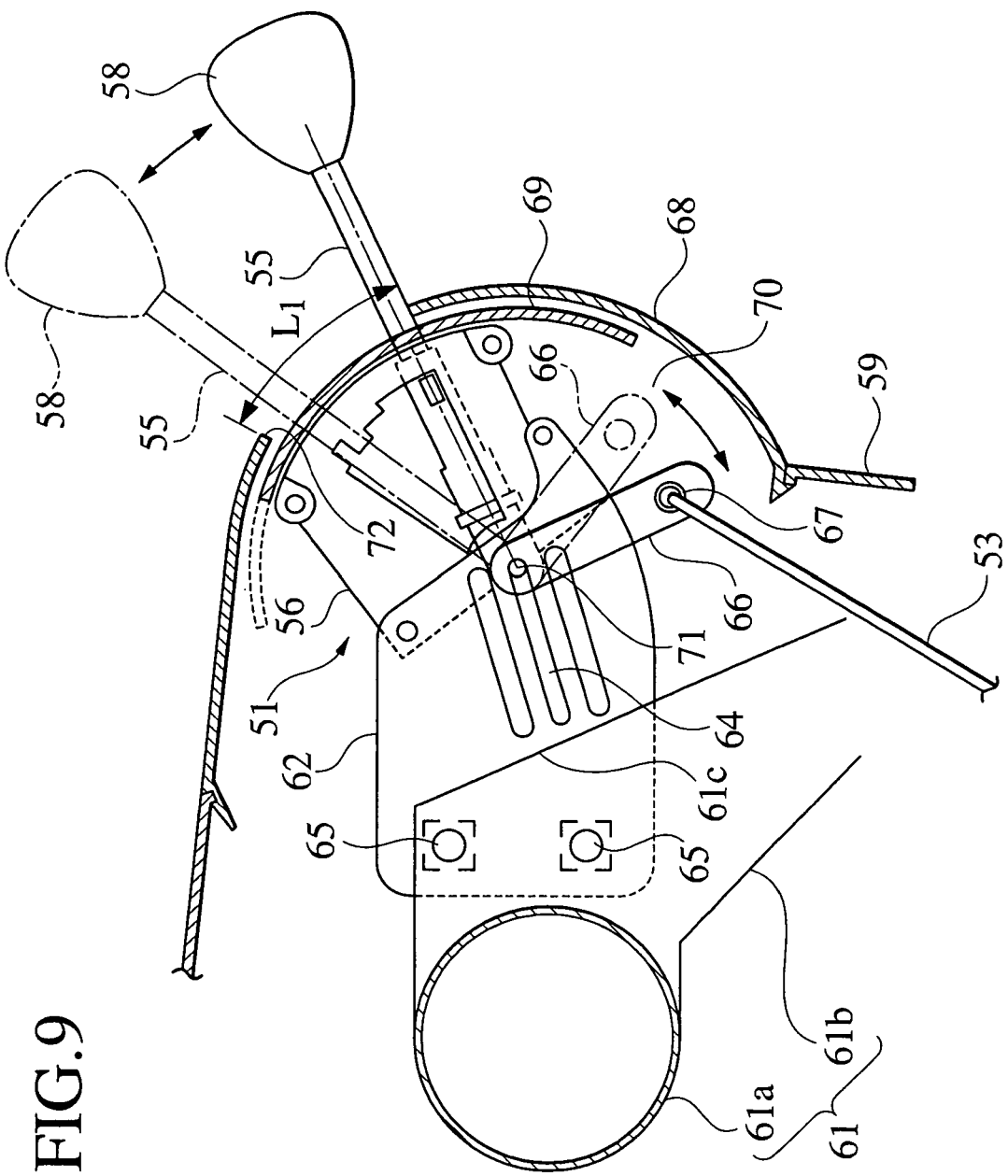
FIG. 9 is an enlarged cross sectional view showing an area where an operation input unit is mounted to a cross car beam via a bracket, of the vehicular automatic power transmission operating device of the second embodiment of the present invention.

As shown in FIG. 9, the bracket 62 is fixed to a rear side 61c of the support stay 61b (closer to the cross car beam body 61a) via bolts (fixtures) 65. In order to absorb impact energy resulting from the operator colliding the operating lever 55 in secondary collision, the bracket 62 is formed with a slide recess 64 to cause the operating lever 55 to be retracted toward the instrument panel compartment 59. A shaft portion 71 is located at a base end portion of the operating lever 55 and is movably engaged to the slide recess 64. The shaft portion 71 slides along the slide recess 64 in secondary collision.

A lower lever 66 is fixed to a lower end of the operating lever 55. The lower lever 66 has one end fixed to the lower end of the operating lever 55 and the other end (connecting portion 67) connected to the first cable 63 for rotary movement. Also, the lower lever 66 is fixed in position to be substantially perpendicular to the operating lever 55.

The connecting portion 67 of the lower lever 66 is located below the operation input unit 51 and in an area close proximity to a vehicle front with respect to a finisher section 68 of the instrument panel 59. More particularly, the connecting portion 67 is located in a dead space 70 for ensuring a moving locus of a slide plate 69 that rotates in a forward area of the finisher section 68 accompanied by rotation of the operating lever 55.

In FIG. 9, a position ("P" range position) of the operating lever 55, indicated by a single dot line, remains in a status to allow the automatic power transmission to be positioned the "P" range. Also, a position ("D" range position) of the operating lever 55, indicated by a solid line, remains in a status to allow the automatic power transmission to be positioned the "D" range. Consequently, rotating the operating lever 55 from the "P" range position to the "D" range position allows the lower lever 66 to travel from the forward area of the finisher section 68 toward an area beneath the operation input unit 51, thereby pushing the first cable 53 toward the vehicle front.

Formed in the finisher section 68 of the instrument panel 59 is an opening portion 72 that permits the operating lever 55 to rotationally move. The opening portion 72 is formed in a circular arc with a length $L_1$. The slide plate 69 rotates along the opening portion 72 of the finisher section 68 during rotary movement of the operating lever 55 and closes the opening portion 72 at all times. A length of a circular arc of the slide plate 69 is designed to have a value greater than two times longer than the length $L_1$ of the circular arc of the opening portion 72. In the "D" range position, the operating lever 55 is positioned in the rearmost area of the vehicle. Under such a condition, the lower lever 66 is parallel to the rear side 61c of the support stay 61b and a dead space 70 is formed in the vehicle front area at the lowest end of the slide plate 69.

The vehicular automatic power transmission operating device 50 has features listed below.

Since the connecting portion 67 of the lower lever 66 is located in the dead space 70 for ensuring the moving locus of the slide plate 69, the area beneath the operation input unit 51 is effectively utilized by lower lever 66.

Figure 10:
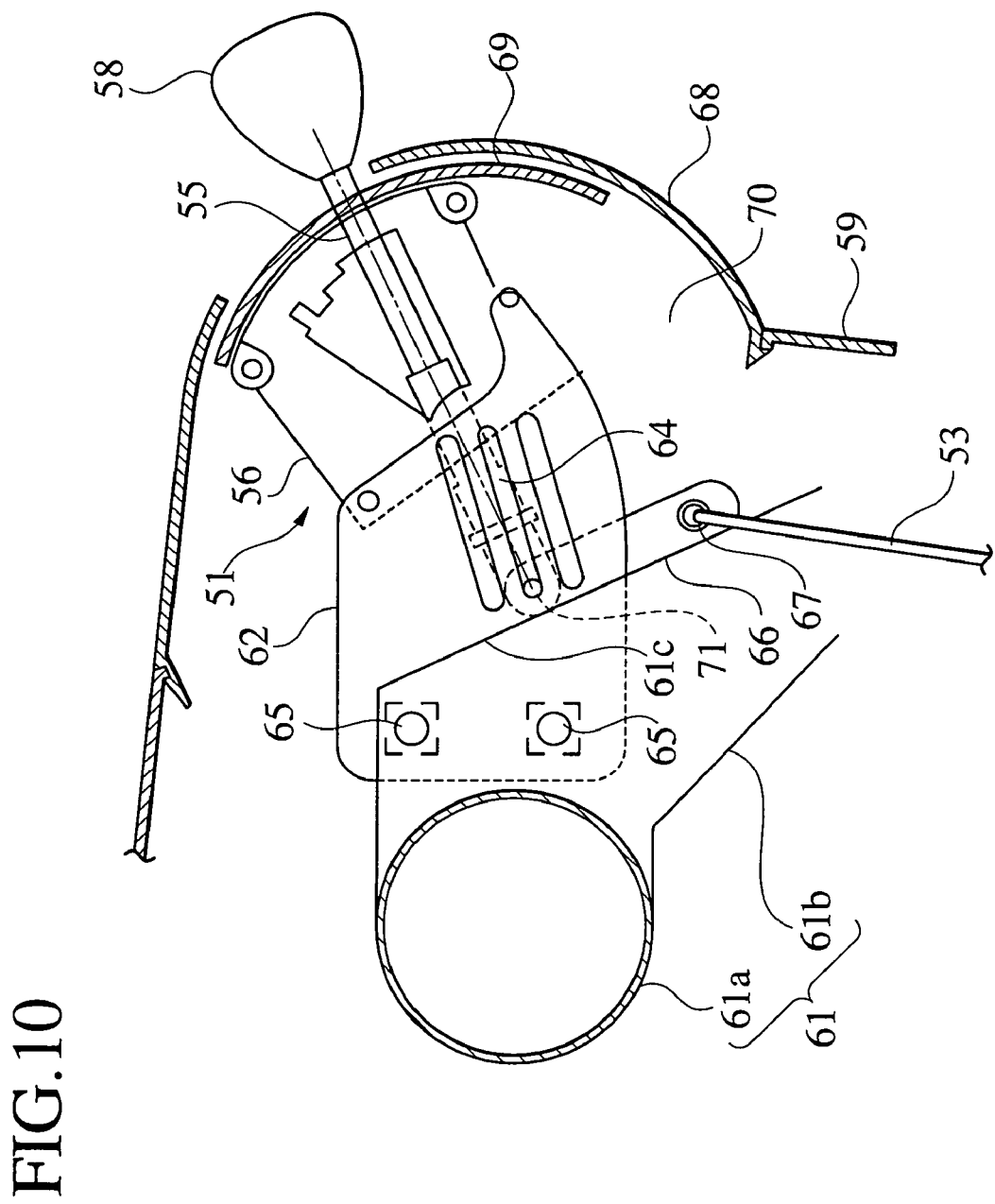
FIG. 10 is a schematic illustrative view showing a condition in which an operating lever is retracted in an instrument panel compartment upon receipt of secondary collision, of the vehicular automatic power transmission operating device of the second embodiment of the present invention.

If upon the occurrence of vehicle collision, the operating lever 55 is applied with load, the operating lever 55 is retreated into the instrument panel compartment 60 as shown in FIG. 10. When this takes place, since the lower lever 66 is fixedly positioned to be substantially perpendicular to the operating lever 55 and the connecting portion 67 is located in a forward area of the finisher section 68, the lower lever 66 does not interfere with the cross car beam 61. Accordingly, since no need arises for a space to be provided to accommodate the lower lever 66 in the vicinity of a side area of the cross car beam 61, the operation input unit 51 and the instrument panel 59 can be located closer to the vehicle front. This results in an increased space in the vehicle compartment 57, and various component parts can be located in the instrument panel compartment 60 in a freely designed layout. As a result, the instrument panel compartment 60 has the space where an operating lever 55 is moved toward the vehicle front in secondary collision, without narrowing a vehicle compartment 57.

Since the operation input unit 51 is located rearward of the cross car beam body 61a of the cross car beam 61, a distance between the operation input unit 51 and the cross car beam body 61a is shortened to enable momentum of the operating lever 55 to be decreased, thereby providing a capability of increasing a rigidity of the bracket 62.

What is claimed is:

1. A vehicular automatic power transmission operating device, comprising:
    an operating lever for creating operational force to shift into a position of an automatic power transmission;
    an operating knob disposed at an upper end of the operating lever;
    an accommodating member for accommodating a base end portion of the operating lever;

a torque detector for detecting the operational force, wherein an input shaft and an output shaft of the torque detector serving as a rotary shaft of the operating lever;

a mounting member for mounting the torque detector to the base end portion of the operating lever, wherein the mounting member having first and second fixing portions for fixing the input shaft thereto and first and second bearing portions for rotatably supporting the output shaft thereto; and a power assist unit for adding power assist force to the operational force in response to output of the torque detector.

2. The vehicular automatic power transmission operating device according to claim 1, wherein under a condition where a flat shaped lower end surface of the input shaft is held in abutting engagement with a bottom surface of a rectangular recessed portion formed on an upper end surface of the second fixing portion, the second fixing portion is assembled to the first fixing portion.

3. The vehicular automatic power transmission operating device according to claim 1, further comprising an input shaft guide portion extending from a lower central portion of the first fixing portion for guiding the input shaft.

4. The vehicular automatic power transmission operating device according to claim 1, wherein the first bearing portion is coupled to the second bearing portion using a ring member having an elasticity.

5. The vehicular automatic power transmission operating device according to claim 1, wherein the torque detector is fixed in the accommodating member by sandwiching a flat board formed on an end of the torque detector between inner walls of the accommodating member.

6. The vehicular automatic power transmission operating device according to claim 5, further comprising resilient members placed on the inner walls of the accommodating member and held in abutting engagement with the flat board of the torque detector.

7. The vehicular automatic power transmission operating device according to claim 1, further comprising a resilient member disposed on one of inner wall surfaces of the accommodating member in abutting engagement with the mounting member so as to press the mounting member toward the other one of the inner wall surfaces of the accommodating member.

8. The vehicular automatic power transmission operating device according to claim 1, wherein the accommodating member has an upper end surface formed with a slide bore portion for receiving the base end portion of the operating lever therein.

9. The vehicular automatic power transmission operating device according to claim 8, further comprising a slide member mounted on the operating lever and sliding in contact with an opening inner-peripheral edge of the slide bore portion.

10. The vehicular automatic power transmission operating device according to claim 9, wherein the opening inner-peripheral edge is formed with a guide portion to guide the slide member.

11. The vehicular automatic power transmission operating device according to claim 9, further comprising a support located on the operating lever to support the slide member.

12. The vehicular automatic power transmission operating device according to claim 9, wherein the slide member is located on the operating lever at a position closer to the operating knob than the rotary shaft of the operating lever.

13. A vehicular automatic power transmission operating device, comprising:

an instrument panel compartment formed in a vehicle compartment with a instrument panel;

an operation input unit disposed in the instrument panel compartment to transfer operational force, for shifting into a position of an automatic power transmission, to the automatic power transmission, wherein the operation input unit having an operating lever protruding from the instrument panel compartment toward the vehicle compartment to create the operational force;

an operational force transfer lever disposed in the instrument panel compartment and having one end fixed to the operation input unit; and a cable disposed in the instrument panel compartment and mounted to the other end of the operational force transfer lever for transferring the operational force to the automatic power transmission, wherein the other end of the operational force transfer lever being disposed beneath the operation input unit in the vicinity of the instrument panel.

14. The vehicular automatic power transmission operating device according to claim 13, wherein an opening portion for permitting the operating lever to slide is formed in the instrument panel.

15. The vehicular automatic power transmission operating device according to claim 14, further comprising a cover member provided on the operating lever for covering the opening portion and rotationally moving together with the operating lever.

16. The vehicular automatic power transmission operating device according to claim 15, wherein when the operating lever is located in the lowest end of the opening portion, the other end of the operational force transfer lever is located in a forward area of a lower end of the cover member.

17. The vehicular automatic power transmission operating device according to claim 13, wherein the operational force transfer lever is fixed to the operating lever such that when the operating lever slides from a "P" range position to a "D" range position, the cable moves from a lower area of the operation input unit toward a vehicle front.

18. The vehicular automatic power transmission operating device according to claim 13, further comprising a cross car beam disposed in the instrument panel compartment and extending in a vehicle widthwise direction, wherein the operation input unit is fixed to the cross car beam through a mounting member to be located in the vicinity of the cross car beam.

19. The vehicular automatic power transmission operating device according to claim 18, wherein a slide recess is formed in the mounting member for retracting the operating lever in the instrument panel compartment when the operating lever is applied with load toward a vehicle front.

20. The vehicular automatic power transmission operating device according to claim 18, wherein the operational force transfer lever is parallel to the rear side of the cross car beam under a condition that the operating lever locates in the "D" range position.

21. The vehicular automatic power transmission operating device according to claim 13, wherein the operational force transfer lever is fixed to the operating lever under a condition to be substantially perpendicular to the operating lever.

* * * * *